(No Model.) 2 Sheets—Sheet 1.

E. A. SPERRY.
COUPLING DEVICE.

No. 562,500. Patented June 23, 1896.

Witnesses.
L. P. Abell.
M. Nielson.

Inventor.
Elmer A. Sperry.

(No Model.) 2 Sheets—Sheet 2.

E. A. SPERRY.
COUPLING DEVICE.

No. 562,500. Patented June 23, 1896.

Witnesses.
L. P. Abell.
M. Nielson.

Inventor.
Elmer A. Sperry

UNITED STATES PATENT OFFICE.

ELMER A. SPERRY, OF CLEVELAND, OHIO, ASSIGNOR, BY MESNE ASSIGNMENTS, TO THE GENERAL ELECTRIC COMPANY, OF NEW YORK.

COUPLING DEVICE.

SPECIFICATION forming part of Letters Patent No. 562,500, dated June 23, 1896.

Application filed July 3, 1894. Serial No. 516,461. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Coupling Devices for Electric or other Cars, of which the following is a specification.

My invention relates to improvements in power-gearing for motor-trucks, and relates to the method of support, inclosure, and details of such gearing, especially where the motor is allowed freedom and independence of movement.

My invention is fully described and illustrated in the following specification and accompanying drawings, the novel features thereof being specified in the claims annexed to the said specification.

Figure 1:
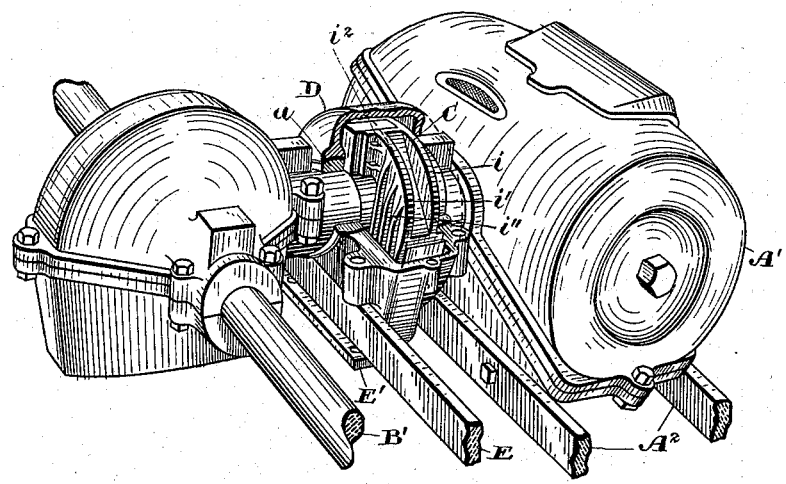
Figure 2:
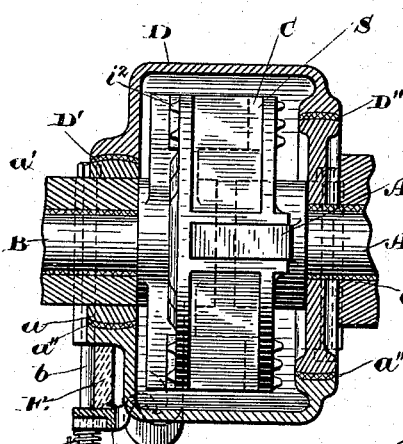
Figure 3:
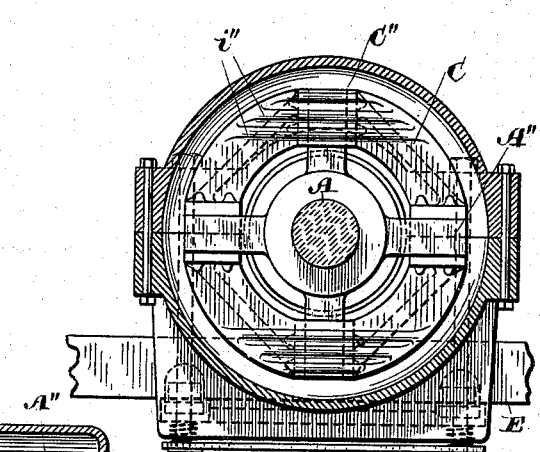
Figure 4:
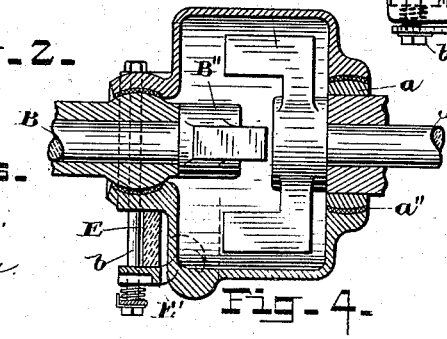
Figure 5:
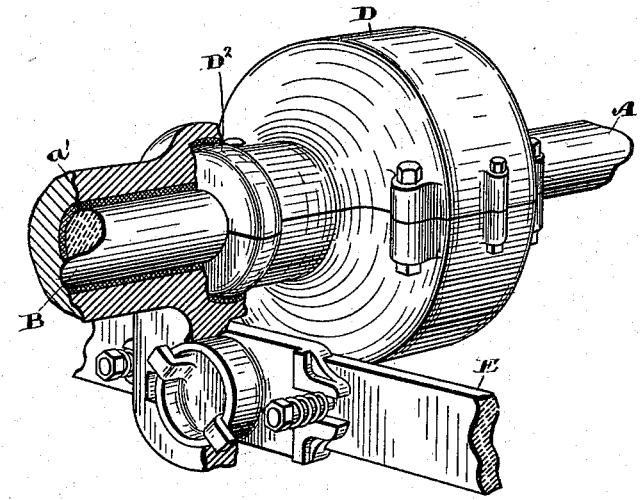
Figure 8:
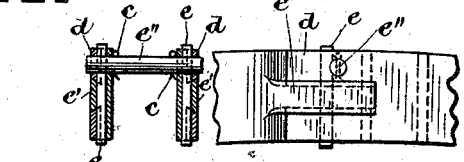
Figure 6:
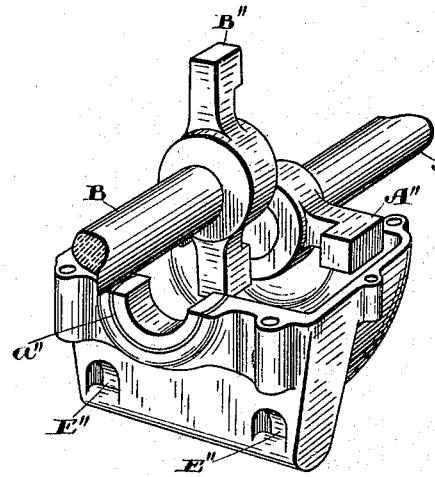
Figure 7:
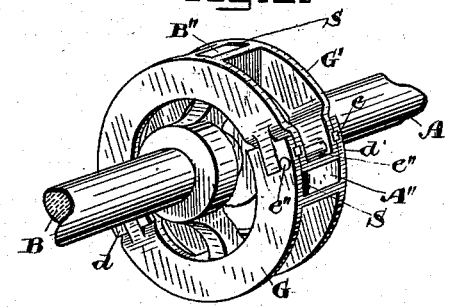

In the drawings, Figure 1 is an isometrical view, partially in section. Figs. 2 and 3 represent sections of the containing, protecting, or inclosing housing. Fig. 4 shows an alternate form of mounting such housing. Fig. 5 is a detail of support. Fig. 6 represents details of removal and of housing. Figs. 7 and 8 illustrate details of the coupling.

Like letters of reference indicate similar parts throughout.

The coupling herein shown is designed to impart motion from one rotating portion to another, especially where the rotary portions are free for relative independence of movement, at the same time sustaining a power driving connection.

Referring now to the figures, let A represent a shaft, for instance the revolving part of the motor A', and B a coöperating revolving shaft, which may be the shaft geared to the axle B'.

A'' and B'' represent winged projections from said shafts which are coupled by means of a float or ring C, having slots C'' provided for the wings substantially at right angles to each other and which may open on opposite faces of the ring C, which ring in this form is provided with two semicircular flanges $i\ i'$, (see Fig. 1,) which in turn are provided with ribs $i''$ at the back where the slot is open on the opposite side and with bracketed lips $i^2$ at the opening.

The casing D incloses, protects, or contains the coupling or clutch as a whole and may serve at the same time to contain lubricant for the coupling. The casing may rest upon spherical surfaces D' D'', (see Fig. 2,) the former in this figure being upon a loose ring $a$, which slides freely upon the outside of the journal-bearing $a'$, it being understood that all the joints are sufficiently tight to serve the purpose of retaining oil or lubricant if necessary. The insertion $a''$ (shown in cross-section lines in the various figures) represents a lining of Babbitt or like material, which effects a saving in machine work and makes a very tight joint. The housing may be supported by the bar E (see Figs. 1 to 4) by a hooked slide E' fitting into the notches E'' (see Fig. 6) within the housing and supported at the outer end by a bolt $b$.

In Fig. 4 a sliding ring $a$ is shown on the motor side and a spherical surface solid on the journal-bearing on the other side, or in juxtaposition to the shaft B. A spring or resilient medium F is indicated upon the bolt $b$ and a cross-bar $b'$ may be used under same to steady the bolts and lock the nuts. The motor rests upon the bars $A^2\ A^2$.

In Fig. 5 the spherical surface $D^2$ is concave in the journal-bearing $a'$ and convex on the housing D, which fits inside same. Any well-known form of support may be used for the journal-bearing $a'$ and shaft B. Sometimes it becomes necessary to remove the one shaft A or B without disturbing the other, in which case it is desirable to have the clutch separable.

Figs. 7 and 8 are devoted to details of the separable clutch, which will be readily understood from the following: One half of the ring G is provided with protruding lips $d$, which extend over the other half G' of the ring-coupling. A slot or depression is sunk in the coöperating faces of each for the key $e$. This is shown in section to the left in Fig. 8. One portion is also dovetailed into the other, as shown at $e'$ in Fig. 8, and a retaining-pin $e''$ is run through in such a way as to notch into the key e and retain same in position. This in turn may be held by cotters c. When the two halves G and G' are brought together and the key is inserted, a rectilinear space is provided for the arms A'', in which space they are free to work back and forth, and also a space indicated by S in Fig. 7. This space allows of the end or angular play of the shafts with reference to each other.

A number of variations in construction are shown in the drawings and others may be made without departing from the spirit of the invention. When the ring is formed as shown in Figs. 7 and 8, in which the arms are inclosed on their four sides, it may be made much lighter than the one shown in the earlier figures, in which one side of the slot is open.

The use and operation of the device shown herein will be readily understood from the foregoing.

The clutches not only provide for discrepancy in true axle alinement, but the axles may also work at an angle to each other, which, with the ring properly made, can be considerable. The shafts can also readily pull apart and advance toward each other while in operation, and at the same time the housing will accommodate all of these various motions about the spherical surfaces and the slipping ring a or its equivalent. The depressions E'' are useful in doing away with the necessity of bolts on the other side of the supporting-bar E. It will be found on examination of Figs. 7 and 8 that the pins e'' lock all the parts in their proper relation, and that when so locked and the key e is in position there need be no motion in any direction of the parts G and G' of the ring.

By the construction which I have described it is possible to couple the shafts or axles with each other without special regard to their alinement and transmit power between them in either direction or to any amount with but very slight loss and occupying a very small space lengthwise upon the shafts.

I do not confine myself to the exact construction of the device shown and described, as it is evident the apparatus may be largely modified without departing from the spirit of the invention, and although it is designed to use all these features in connection with one another, yet it is obvious that some may be used without the others, and the invention extends to such use.

Having described my invention, what I claim as new, and desire to secure by Letters Patent, is—

1. In a coupling for shafts, power driving connection between the shafts, permitting displacement of said shafts in parallel planes, journals for each of the shafts, a spherical-surface projection mounted upon each journal, and an inclosing housing surrounding the power driving connection and having at each end spherical bearings seated upon such surfaces.

2. In a coupling for shafts, power driving connection between the shafts, journals for each of the shafts, a spherical-surface projection mounted upon each journal, an inclosing housing surrounding the power driving connection and seated upon said surfaces, one of the spherical-surfaced projections being longitudinally movable on the journal upon which it is mounted.

3. In a coupling for shafts, power driving connection between the shafts, journals for each of the shafts, a spherical-surface projection mounted upon each journal, an inclosing housing surrounding the power driving connection and seated upon said surfaces, one of the spherical-surfaced projections being longitudinally movable on the journal upon which it is mounted, and a support for one of the journals connected to said housing.

4. In a coupling for shafts, power driving connection between the shafts, permitting displacement of said shafts in parallel planes, journals for each of the shafts, a spherical-surface projection mounted upon each journal, and a separable inclosing housing surrounding the power driving connection and having at each end spherical bearings seated upon said surfaces.

5. In a coupling for shafts, power driving connection between the shafts, journals for each of the shafts, a spherical-surface projection mounted upon each journal, an inclosing housing surrounding the power driving connection and seated upon said surfaces, one of the spherical-surfaced projections being longitudinally movable on the journal upon which it is mounted, and a support for one of the journals connected to said housing located upon the side of the housing next to such movable projection.

6. In a coupling for shafts, the combination of winged projections extending from each shaft with their planes normally at right angles to each other, an independent float for connecting such wings supported mutually by each of the wings consisting of two disks between which are formed four pockets alternately accommodating the wings of each shaft.

7. The combination of two shafts, winged projections extending from each shaft, the wings of one shaft lying normally at right angles to the wings of the other shaft, and an independent float for coupling the wings, composed of two parallel annular plates united by cross-partitions, each adjacent pair of partitions forming with said plates an open-ended pocket for a winged projection, substantially as described.

8. In a coupling for shafts, winged projections extending from each shaft, the wings of one shaft lying normally at right angles to the wings of the other shaft, and a separable independent float for coupling the wings composed of similar parts united on radial lines.

9. In a coupling for shafts, winged projections extending from each shaft, the wings of one shaft lying normally at right angles to the wings of the other shaft, and a separable independent float for coupling the wings, a line of separation of the parts of the float being at the line of contact of said float with the wings of one of the shafts.

10. In a coupling for shafts, winged projections extending from each shaft, the wings of one shaft lying normally at right angles to the wings of the other shaft, a separable independent float for coupling the wings, a key as $e$ for securing the portions, and a lock for the key.

ELMER A. SPERRY.

Witnesses:
M. NIELSON,
FRED CHEETHAM.